United States Patent [19]
Castiello

[11] Patent Number: 4,631,779
[45] Date of Patent: Dec. 30, 1986

[54] ANIMAL SLAUGHTERING APPARATUS WITH ITS CARTRIDGE FEEDER ADVANCED AUTOMATICALLY, SIMULTANEOUSLY WITH THE RESETTING OF THE FIRING PIN

[75] Inventor: Gualtiero Castiello, Brescia, Italy

[73] Assignee: Berera & C. s.n.c., Reggio Emilia, Italy

[21] Appl. No.: 722,072

[22] Filed: Apr. 11, 1985

[51] Int. Cl.⁴ .............................................. A22B 3/02
[52] U.S. Cl. ...................................................... 17/1 B
[58] Field of Search ..................... 17/1 B; 227/8, 130; 42/1 M, 14, 16, 17

[56] References Cited
U.S. PATENT DOCUMENTS 4,114,792  9/1978  Pomeroy ................................ 227/8
4,531,322  7/1985  Termet ............................. 17/1 B X

*Primary Examiner*—Willie G. Abercrombie
*Attorney, Agent, or Firm*—Bucknam and Archer

[57] ABSTRACT

An automatically loaded animal slaughtering apparatus comprises means (18, 20) for the stepwise advancement of a cartridge strip feeder (1) and means (13) for resetting the firing pin (10) after firing a cartridge (2); the cartridge feeder is advanced by said means (13) for resetting the firing pin (10), so that the loading operation and setting operation are carried out simultaneously by means of a single operation.

3 Claims, 5 Drawing Figures

ANIMAL SLAUGHTERING APPARATUS WITH ITS CARTRIDGE FEEDER ADVANCED AUTOMATICALLY, SIMULTANEOUSLY WITH THE RESETTING OF THE FIRING PIN

For animal slaughtering, pistols are used in which an explosive cartridge causes the instantaneous, temporary emergence of a solid or hollow cylindrical steel spike from the barrel, which perforates the forehead bone of the animal and damages its brain, so killing it.

After firing, said spike is returned to its position within the barrel by suitable elastic means.

The known apparatuses are generally of the single loading type, in the sense that after each firing operation the breech block has to be opened in order to insert a new cartridge into the relative explosion chamber, and the firing pin then reset for subsequent use of the apparatus.

This obviously prevents immediate reutilisation of the apparatus for firing a second shot in order to effectively kill the animal without unnecessary suffering or delay, should the first shot not have produced a lethal effect.

A type of automatically loaded apparatus for abatoirs has already been proposed, using a cartridge strip feeder which is advanced stepwise in order to move the cartridges into the explosion chamber in succession after each firing of the apparatus.

Such an apparatus is however very complicated from both the constructional and operational viewpoints. This is because the means provided for advancing the feeder are separate from those used for the resetting, and they are operated separately at different times. The loading operation and resetting operation are carried out separately, the former by rotating a protection sleeve provided at the end of the barrel in order to release it, this simultaneously opening the breech block, and the latter by moving the firing pin into a position in which it is engaged by a release lever controlled by the trigger, after closing the breech block and returning the protection sleeve into its initial position.

These operations are laborious and uncomfortable to carry out, and there is nothing to prevent the firing pin becoming inadvertently reset before the feeder has been advanced, so that it is possible for the firing pin to become accidentally and uncontrollably released to fire the cartridge by operating the apparatus when the next cartridge is loaded into the explosion chamber.

The present invention relates to an animal slaughtering apparatus, and has the object of proposing an abbatoir apparatus in which the loading of the cartridge into the explosion chamber and the resetting of the firing pin are effected simultaneously, by means of a single operation, and after the opening and closure of the apparatus breech block.

A further object of the invention is to provide an abbatoir apparatus of particularly simple and functional structure, which allows simple and immediate setting-up for use and thus repetitive utilisation of the apparatus.

One embodiment of the apparatus according to the present patent is described hereinafter by way of non-limiting example with reference to the accompanying drawing in which.

Figure 1:
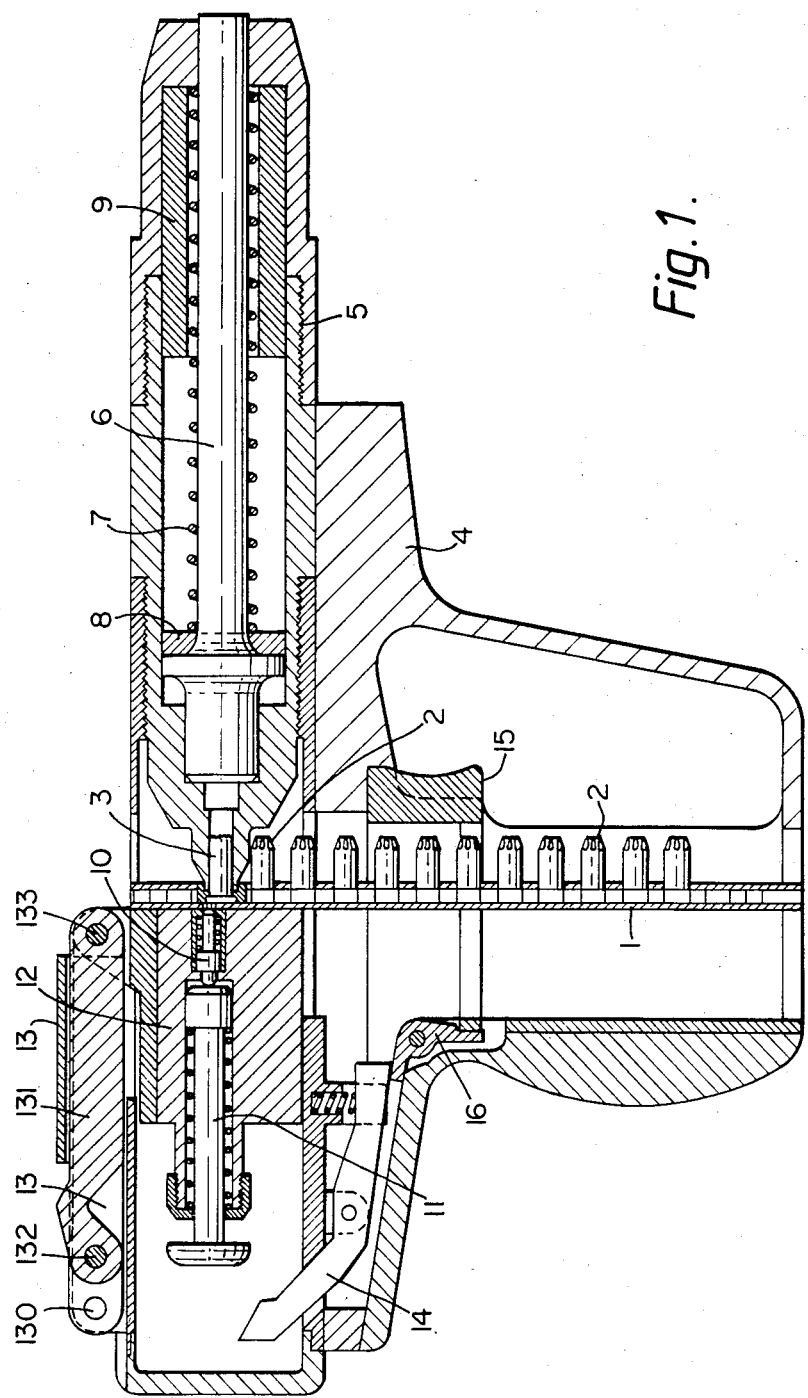
FIG. 1 is a longitudinal section through the apparatus in the position ready for resetting after firing a cartridge.

As stated heretofore, the apparatus is of the automatic loading type and uses a cartridge strip feeder 1 designed to advance stepwise so that each of its cartridges 2 is moved progressively into alignment with the apparatus explosion chamber 3.

The apparatus comprises a body 4 with a barrel 5 in which a slaughtering spike 6 is guided to move positively forwards by the action of the gas produced by firing the cartridge 2 in the explosion chamber 3, and is returned in the opposite direction by a return spring 7 which also acts as a shock absorber in association with buffer elements 8, 9.

In order at any given time to fire one cartridge 2, there is provided a firing pin 10 which is struck by a striker element 11 is the form of a spring-loaded plunger, both being mounted on a breech block 12 which is mobile axially in order to close the explosion chamber 3 and lock the cartridge 2 therein during firing, and then open the explosion chamber in order to extract the cartridge case.

The strip feeder 1, which extends vertically through the grip of the apparatus, is guided in the front part of the breech block 12, and there is connected to the breech block 12 a toggle-joint lever 13 for manually moving this latter from the closed position to the open position together with the feeder.

In particular, the lever 13, pivoted at 130, can rotate backwards through 180° (FIG. 2) and, by means of the connecting rod 131 pivoted at 132 to the lever 13 and at 133 to the breech block 12, drag this latter into the open position.

When in this position (FIG. 2) the striker element 11 for the firing pin 10 is engaged in the set state by an engagement lever 14 controlled by a trigger 15 by way of a release lever 16, which causes the release of the striker element for firing purposes.

On the breech block 12 there is also mounted (FIG. 3 and FIG. 5), pivoted at 17, a rocker lever 18 having a first arm 18' connected at 19 to a thrust pawl 20 designed to engage with the strip feeder 1 in order to advance it, and a second arm 18'' cooperating with a stationary cam 21 provided in the apparatus body in order to cause the rocker lever 18 to move angularly and advance the feeder through one step by the action of the pawl 20 when the breech block 12 is moved from the closed position to the open position, the pawl engaging in holes or slots provided in said feeder.

Figure 4:
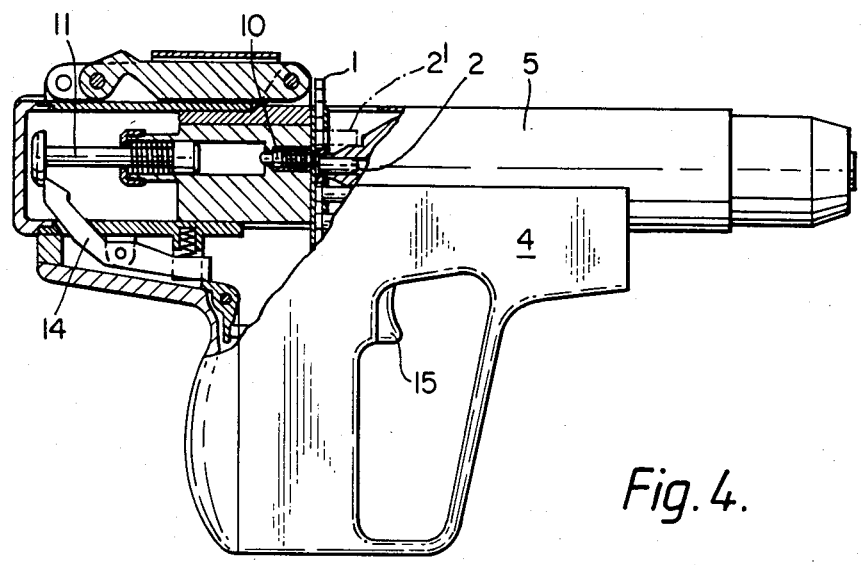
FIGS. 4 and 5 are the same sectional views of the apparatus as shown in FIG. 2 and FIG. 3, but with the apparatus now ready for firing.

FIG. 4 shows the apparatus ready for use. When in this state, the breech block 12 has been moved into the position in which it closes the explosion chamber in order to lock a cartridge 2 therein, and the striker element 11 is locked in the set position by the engagement lever 14, the spike 6 having been moved into its inactive position within the apparatus barrel.

Figure 5:
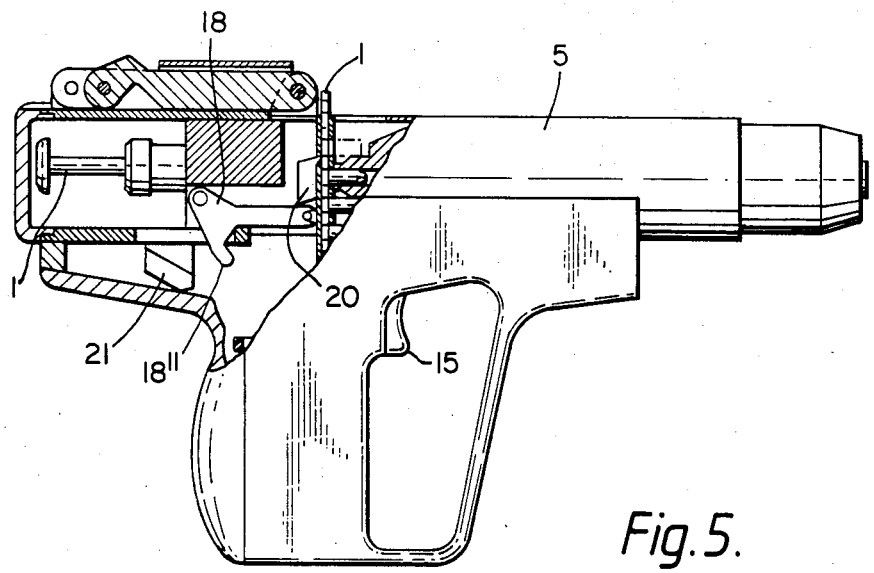

In addition, when the apparatus is in this state the rocker lever 18 has been moved away from the barrel 21, so that the thrust pawl 20 has been moved downwards with respect to the feeder as shown in FIG. 5, by the effect of a return spring.

It is now necessary only to grip the apparatus and operate the trigger 15 in order to use it for slaughtering an animal by means of the spike 6. In this respect, the striker element 11 becomes released and acts on the firing pin 10 to fire the cartridge 2 and thus operate the spike 6.

After the cartridge 2 has been fired by the apparatus, this latter returns to the state shown in FIG. 1, ready for resetting and reuse.

Figure 2:
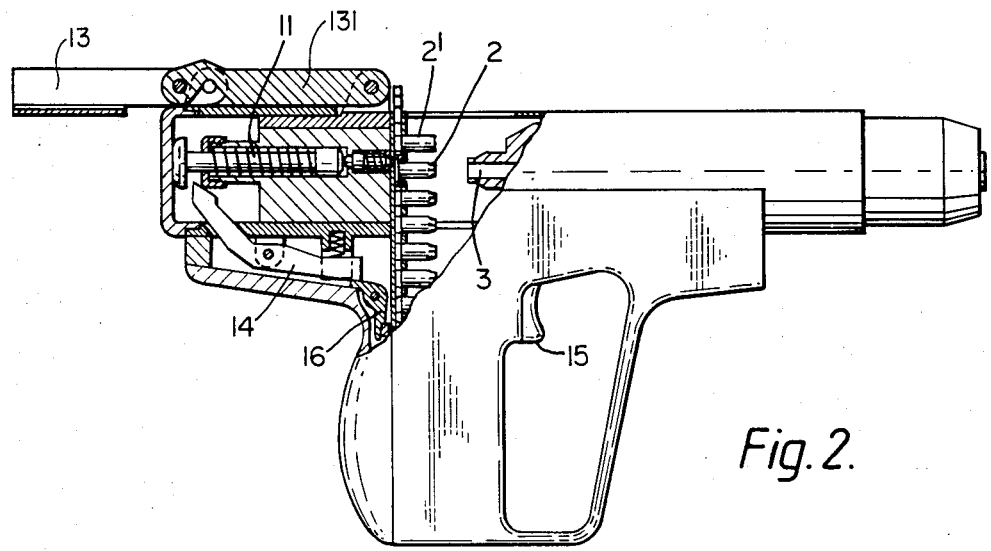
FIG. 2 is a partial section through the apparatus in the resetting stage, with particular reference to the means for engaging the striker element with the firing pin.

For resetting, it is necessary only to operate the toggle-joint lever 13 in order to move the breech block 12 backwards, this simultaneously moving the feeder 1. By means of this single operation on the breech block, the striker element 11 becomes reset and the feeder 1 becomes advanced through one step simultaneously. In this respect, when the breech block is moved backwards as shown in FIG. 2, the striker element 11 is engaged and locked by the engagement lever 14, which thus sets it.

Figure 3:
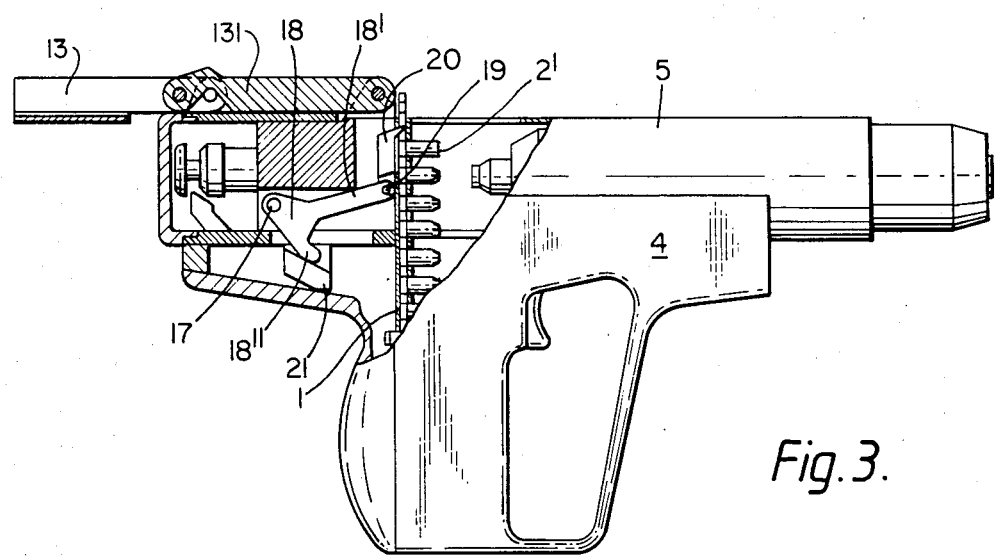
FIG. 3 is a vertical section through the apparatus on a plane different from that of FIG. 2, in order to show the means for advancing the cartridge feeder.

At the same time, the rocker lever 18, on moving with the breech block 2, encounters the cam 21 by way of its arm 18", and is therefore obliged to rotate and to cause the feeder 1 to be advanced through one step by means of the thrust pawl 20, in order to remove the fired cartridge case 2' and to dispose a new cartridge 2 in line with the explosion chamber 3 as shown in FIG. 3. By closing the breech block 12, the striker element 11 remains set ready to act on the firing pin, and the new cartridge becomes inserted into the explosion chamber, thus restoring the state shown in FIGS. 4 and 5, for immediate use of the apparatus.

What is claimed is:

1. An animal slaughtering apparatus which comprises an explosion chamber (3), a cartridge strip feeder (1) aligned with said explosion chamber, a body (4) in the rear of said explosion chamber, a barrel (5) located in said body, a spike (6) moving forwardly in said barrel when a cartridge inserted in the explosion chamber is fired, a breech block (12) positioned forwardly of said explosion chamber and movable rearwardly and forwardly to close and to open said explosion chamber, said breech block carrying a firing pin (10) and a spring loaded striker element (11), means (18, 20) for advancing the cartridge feeder (1) stepwise simultaneously with the movement of said breech block, to obtain setting of the striker element (11) and the loading of a cartridge (2) into the explosion chamber by a single operation, after a cartridge has been fired, wherein said means for advancing the cartridge feeder (18,20) comprise a rocker lever (18) pivoted to the said breech clock (12) and having a first arm (18') and a second arm (18"), a stationary cam (21) located in said body and a thrust pawl (20), said first arm being connected to said thrust pawl and being designed to engage and move said cartridge feeder (1), said second arm (18") being designed to engage said stationary cam (21) in order to move said pawl (20) and simultaneously to move the feeder upwardly when the breech block is moved into the position for opening the explosion chamber (3).

2. The apparatus according to claim 1 which comprises a toggle joint lever (13) connected to said breech block, said toggle joint lever moving said breech block into the open position.

3. The apparatus according to claim 1 which comprises a return spring (7) urging said spike (6) and buffer elements (8,9) associated with said spike, said return spring acting as a shock absorber in combination with said buffer elements.

* * * * *